March 7, 1944.  A. F. C. GREGORY  2,343,663
NONSPILL VENT MEANS
Filed March 26, 1942
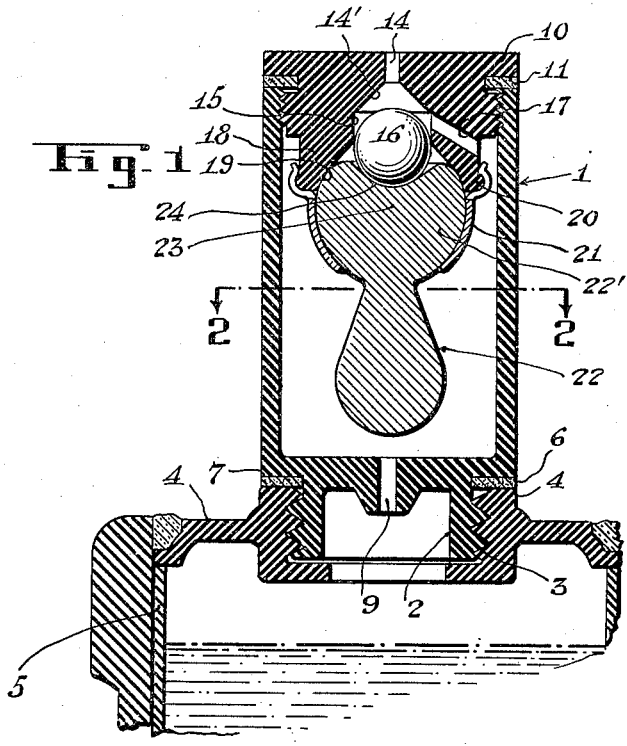
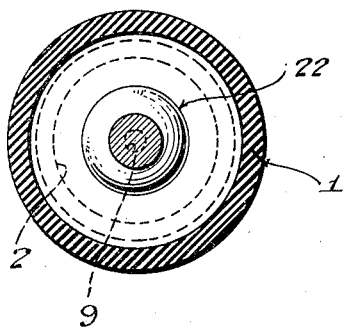
Inventor
Alan F.C. Gregory
By
Henry Lanahan
Attorney Patented Mar. 7, 1944

2,343,663

UNITED STATES PATENT OFFICE 2,343,663

NONSPILL VENT MEANS

Alan F. C. Gregory, Belleville, N. J., assignor to Thomas A. Edison, Incorporated, West Orange, N. J., a corporation of New Jersey Application March 26, 1942, Serial No. 436,234

4 Claims. (Cl. 137—139)

My invention relates to non-spill vent means for liquid-containing receptacles, and more particularly to non-spill vent plugs for storage batteries.

Storage battery cells are required to be vented to permit an escape of the gases evolved by the cells. In those applications however where the batteries are liable to be tilted or inverted during service, such as is the case with batteries for aeronautical use, it is necessary to provide means to close the vents when the batteries are tilted beyond a predetermined angle so as to prevent an escape of the electrolyte from the battery cells.

It is an object of my invention to provide a non-spill vent means which is positively acting and economical to manufacture.

It is another object to provide simple and improved means in a non-spill vent plug for actuating the valve to closed position.

It is a still further object, in non-spill vent plugs, to actuate the valve to closed position through an improved cam arrangement.

Other and allied objects of my invention will more fully appear from the following description and the appended claims.

In the description of my invention reference is had to the accompanying drawing of which:

Figure 1 is a vertical sectional view to an enlarged scale showing a non-spill vent plug in accordance with my invention; and Figure 2 is a horizontal sectional view taken on the line 2—2 of Figure 1.

The vent plug shown in the accompanying figures comprises a cylindrical shell or casing 1 having a smaller-diameter extension 2 at the bottom which threads into the filler opening 3 provided in the cover 4 of a storage battery cell 5, there being an annular gasket 6 provided between a flange 4' which surrounds the filler opening and a shoulder 7 at the bottom of the casing to form a tight seal. The casing is closed at the bottom except for a vent opening 9 in order to prevent the inflow of sediment or other dirt from the cell into the plug. Threaded into the upper end portion of the casing is a cap 10 which is sealed thereto by a gasket 11 and which has an axial vent opening 14. This vent opening is to be closed when the battery cell is tilted or inverted as is now explained.

The vent opening 14 has a conical valve seat 14' at the bottom and leads into an enlarged diameter passageway 15 which serves as a guideway for a valve 16. This valve is spherically shaped and is preferably made of lead. The passageway 15 is open at the bottom and has a vent 17 at the side leading to the interior of the casing. Surrounding the passageway is a depending annular flange 18 having an interior spherical surface 19. Clipped onto an exterior annular bulge 20 provided on the lower part of this flange is an annular member 21 made suitably of lead or semi-resilient rubber. This member 21 is spherically shaped and conforms with the interior spherical surface 19 of the flange to form a spherical socket. Suspended from this socket is a pendulum weight 22 made suitably of lead and provided with an upper ball-shaped portion 22 which pivotally fits the socket, the weight being thus supported for universal pivotal movement about a point 23 at the center of the socket. In the top of the ball-shaped portion 22' there is provided a cam surface which may be a flat or a circular concavity 24 as shown. It is through this cam surface that the valve 16 is actuated to closed position when the battery cell is tilted, as is now explained.

When the battery cell is in upright position, as is shown in Figure 1, the pendulum weight occupies a position axial in relation to the plug and the concavity 24 occupies a symmetrical position in relation to the passageway 15. The spherical valve 16 now rests at the bottom of the concavity in a position below the side vent 17. The vent openings 14 and 17 are thus in communication with one another to provide a continuous vent passageway from the interior of the plug to the outside. However, when the battery cell is tilted in any direction to a critical angle of say 20° or more, the pendulum weight will tend to maintain a predetermined position relative to the vertical and will thus turn about the point 23 relative to the casing. As the pendulum weight so turns, the spherical valve 16 is cammed up onto the outer surface of the concavity 24 and thus moved against the valve seat 14' to close the vent opening 14. Obviously, any tilting of the battery cell beyond the critical angle which closes the vent opening will operate only to press the valve even tighter against the valve seat and thus to maintain the battery vent closed for all such tilted positions of the battery. When the battery cell is however restored to upright position, the pendulum weight will return to its axial position and the valve 16 will be moved by gravity again below the vent 17 to restore the venting of the plug.

It will be readily seen that the vent plug arrangement above described is very simple in construction and that it can be manufactured very cheaply. In addition to these advantageous features, I find that this vent plug arrangement is very dependable and positive in its operation. This improved operation I attribute particularly as being due to a force magnification on the valve to close it as the cell is tilted, which magnification arises from the particular cam transmission provided between the pendulum weight and the valve.

The particular embodiment herein shown is intended to be illustrative and not limitative of my invention as many changes and modifications may be made therein without departing from the scope of my invention, which I endeavor to express according to the following claims.

I claim:

1. Non-spill vent means for a battery cell comprising a wall provided with a vent, a pendulum weight universally supported for movement about a predetermined point below said vent, said weight having a concavity in the top portion thereof forming a cam surface, and a valve member having a substantially spherical surface engaging the concave cam surface of said weight, said valve member being cammed by said surface to close said vent in response to a movement of said pendulum weight out of a predetermined position relative to said wall about said predetermined point as a center.

2. A non-spill vent plug for the filler opening of a battery cell comprising a casing having a top wall provided with a vent and with an enlarged diameter passageway leading down from said vent, said wall having a flange depending from around said passageway and provided with an interior spherical surface, a member having a ball-shaped part held pivotally to the interior surface of said flange and a depending weight for moving the member relative to the flange when the plug is tilted, said ball-shaped part having a circular concavity at the top, and a spherical valve loosely fitting said passageway and resting on said member in said concavity below the vent in said passageway when said plug is in an upright position, said valve being cammed upwardly through said passageway by said weighted member to close the vent in said top wall when the plug is tilted to a predetermined angle.

3. A non-spill vent plug comprising a cylindrical casing adapted to be threaded into the filler opening of a battery cell, the top wall of said casing being provided with an axial vent and with a valve chamber below said vent, said chamber being vented at the side to the interior of said casing, a flange depending from said top wall about said valve chamber, a member having a ball-shaped part fitting the interior surface of the said flange and provided with a depending weight, an annular spherical member attached to said flange for holding said weighted member suspended for universal pivotal movement, and a spherical valve in said chamber held by gravity against the ball-shaped part of said member, said ball-shaped part having a circular concavity at the top serving as a camming surface for moving the valve upwardly through said chamber into vent-closing position in response to a movement of said weighted member in any direction from a predetermined normal position relative to said casing.

4. A non-spill vent device for a battery cell comprising a wall provided with a vent, a pendulum weight having an upper ball portion; socket means carried by said wall and engaging said ball portion to support said weight for universal movement, said ball portion having a concavity therein forming a cam surface; and a valve for said vent biased toward open position and having a substantially spherical surface engaging said concavity, said weight operating through said surface to cam said valve to closed position upon a pivotal movement of the weight in any direction from a predetermined normal position relative to said wall.

ALAN F. C. GREGORY.